Feb. 25, 1969   P. DESENISS   3,429,747
ELECTRIC CELL
Filed Dec. 12, 1966   Sheet 1 of 2
FIG.1
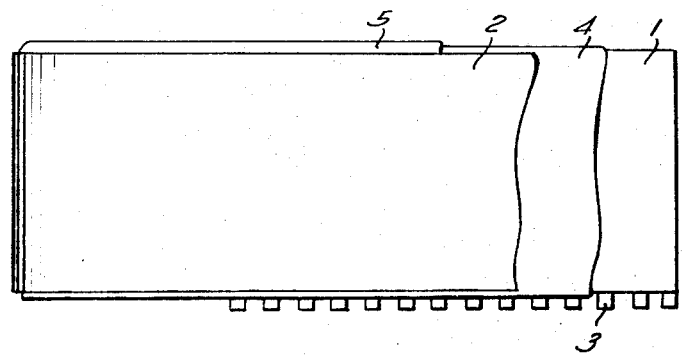
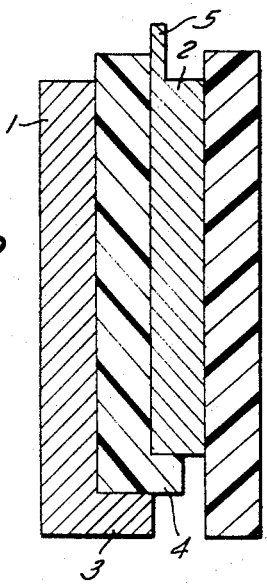
FIG.2
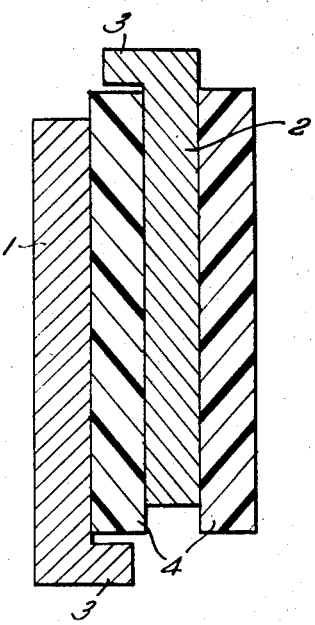
FIG.5
FIG.3
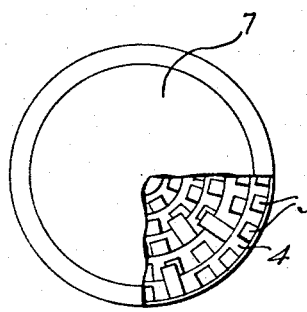
INVENTOR
Philippe Deseniss
BY
Michael S. Striker
ATTORNEY 3,429,747
ELECTRIC CELL
Philipp Deseniss, Hagen, Westphalia, Germany, assignor to Varta Aktiengesellschaft, Frankfurt am Main, Germany
Filed Dec. 12, 1966, Ser. No. 601,126
Claims priority, application Germany, Dec. 11, 1965, V 29,907
U.S. Cl. 136—13        7 Claims
Int. Cl. H01m 35/16

ABSTRACT OF THE DISCLOSURE

An electric cell having a composite roll consisting essentially of rolled electrodes spaced from each other by a rolled separator, wherein an edge of at least the rolled electrode of one polarity is located adjacent an electrically conductive housing portion, and said edge is provided with conductive lugs which extend from said edge of the electrode and contact the electrically conductive housing portion thereby ensuring a reliable electrical connection between the electrode and the housing portion.

BACKGROUND OF THE INVENTION

The present invention relates to cells of electric batteries and particularly to galvanic cells but also to secondary cells with rolled electrodes.

Such cells are known per se. In many cases, the rolled electrodes are inserted into a housing and the latter serves as the current conducting device for withdrawing current from the electrodes. In such cases, the rolled electrode of one polarity is electrically connected with a conductive housing portion, and the rolled electrode of the opposite polarity is electrically connected with another conductive housing portion which is insulated relative to the electrically conductive first-mentioned housing portion. Preferably the two conductive housing portions which are electrically insulated from each other are constituted by bottom and cover portions of the housing. The electric contact between the respective rolled electrode and the housing or cover is generally formed by a flexible electrically conductive connecting member. Since such connecting member necessarily will be of relatively small diameter, batteries of this kind cannot supply high discharge currents. Furthermore, rather involved measures must be taken for insulating these connecting members. The welding at the contact point between the electrode and the connecting member on the one hand, and between the connecting member and the conductive housing or cover portion on the other hand cannot be controlled with desirable accuracy.

It has also been proposed, to form the electric contact between the rolled electrode of one polarity and the housing or cover by causing contact between an entire side edge of the rolled electrode and the adjacent housing or cover portion. However, to proceed in this manner is also connected with several disadvantages. Primarily in the case of very thin rolled electrodes, the pressure contact which in this manner is formed between the electrode edge and the housing or cover portion is insufficient for conducting high currents, and it is not possible to improve the electric connection by utilizing higher pressure since in such case the thin rolled electrodes would be easily bent. Furthermore, by proceeding in this manner, the volume of the cell can be utilized but partly, a disadvantage which also will be found in the first described cell structure, since the positive or negative rolled elcetrodes, respectively, must be set back at one of the opposite cell covers in order to prevent electric contact between cell cover member or the like and both electrodes of opposite polarity. Obviously, the exertion of severe pressure would increase the danger that the corresponding side edge of the electrodes of both polarities would come in contact with the adjacent cover portion. Due to the poor utilization of the inner volume of the cell housing, the capacity of the cell is reduced, particularly in the case of cells having low rolled electrodes. Thereby, the additional danger exists that the electrodes, since the same are under axial pressure, may be dislocated relative to each other in axial direction and this might lead to short circuits and render the cell inoperative in a very short period of time.

It is an object of the present invention to provide a cell structure which will overcome the above discussed difficulties and disadvantages of the present invention and which nevertheless is simple and economical to produce.

The present invention thus proposes to provide in a simple and effective manner an electric connection between the electrically conductive housing or cover portions and the rolled electrodes of opposite polarity, which connection is stable, capable of conducting high currents and will permit better utilization of the inner volume of the cell.

SUMMARY OF THE INVENTION

According to the present invention, an electric cell is provided which comprises, in combination, a housing including an electrically conductive end wall electrically insulated against the remainder of the housing and also including an opposite end wall, a coiled electrode assembly in form of a composite roll located in the housing and consisting essentially of a pair of rolled electrodes of opposite polarity and a separator therebetween, helically wound about each other so that the separator will be interposed between adjacent windings of the electrodes of opposite polarity, and a plurality of conductive lugs extending from the side edge of one of the wound electrodes of opposite polarity adjacent to an electrically conductive end wall or cover portion of the housing and contacting the latter.

Thus, the above described problems are solved in accordance with the present invention by providing at least at one front edge of one rolled electrode conductive lugs which preferably are integral with the respective electrode or consist of the conductive skeleton material of the electrode, which lugs are arranged preferably extending in radial direction from successive windings of the roll, and which lugs are preferably bent by about 90° in the direction toward the axis of the roll so that the lugs will extend in a direction preferably parallel to the face of the housing or cover portion which is contacted by the bent lugs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an elevational, partial broken away, view of a composite roll comprising electrodes of opposite polarity and a separator therebetween, which may be used, for instance, in alkaline storage battery cells;

FIG. 2 is a cross-sectional view through adjacent windings of the composite roll of FIG. 1;

FIG. 3 is an illustration of the roll located in a partially broken away housing, showing the lower edge of the electrode of FIG. 1 which is provided with lugs, after the lugs have been bent so as to extend substantially parallel to the bottom portion of the housing;

FIG. 5 is an elevation, cross-sectional view of adjacent electrode windings according to another embodiment of the present invention.

DESCRIPTION OF THE PREFERRED EMBODIMENTS

Figure 4:
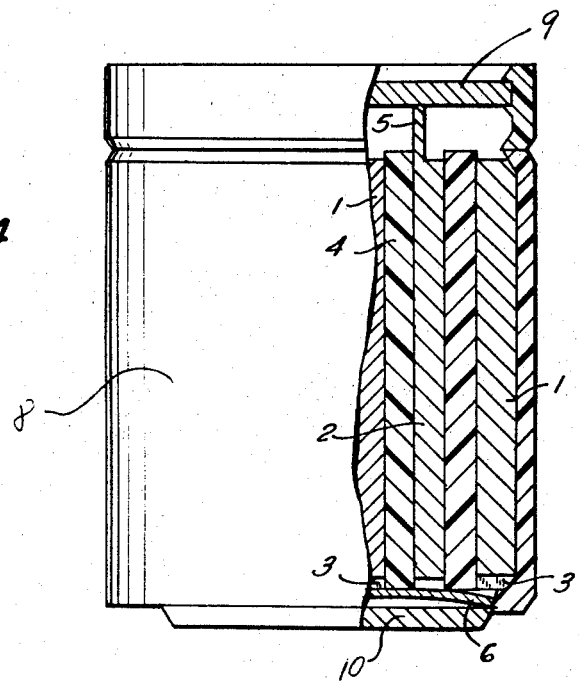
FIG. 4 is an elevational view, partially in cross-section of an embodiment of a cell in accordance with the present invention.

In the embodiment of the present invention according to FIGS. 1–4, only one edge of rolled negative electrode 1 is provided with conductive lugs 3. The opposite edge of positive electrode 2, is provided, in accordance with the presently discussed embodiment, with a continuous upper edge 5 for contacting the adjacent electrically conductive housing portion, as illustrated the upper end portion or cover member of the housing. However, according to other embodiments of the present invention which will be discussed further below, it is also possible to replace edge or rim 5 with an arrangement similar to lugs 3. Separator 4 is arranged between the adjacent windings of negative electrode 1 and positive electrode 2, whereby the width of separator 4 is somewhat greater than that of the electrodes so as to prevent with certainty short-circuiting between the positive and negative electrodes.

As shown in more detail in FIG. 2, negative electrode 1 is provided with lugs 3 which are bent perpendicular to the extension of electrode 1 so as to have an outer face which will be substantially parallel to the housing portion which is to be contacted therewith.

As can be seen in FIG. 2, the rim portion 5 of positive electrode 2 extends outwardly from the edge of positive electrode 2 which is opposite to the edge of negative electrode 1 which is provided with lugs 3, so that rim 5 will contact and, to some extent, will be pressed against the adjacent portion of the battery housing or cover. Separator 4 is shown interposed between adjacent electrodes and extending outwardly from the edges thereof so as to prevent contact and short-circuiting between adjacent windings of electrodes of opposite polarity.

FIG. 3 shows the bottom portion of the cell, and particularly bent lugs 3 which overlap separator 4 and which will contact the bottom portion 7 of the housing. For clarity sake, rolled positive electrode 2 has been omitted from FIG. 3.

FIG. 4 illustrates the above-described arrangement within battery housing 8, and shows metal plate 9 which is contacted by rim 5 of positive electrode 2.

Bent lugs 3 of negative electrode 1 contact metal spring 6 which in turn contacts metal plate 10 forming part of the housing and being insulated against metal plate 9. The insertion of spring 6 serves for achieving the desired degree of pressure contact between rim 5 and metal plate 9 on the one hand, and lugs 3, spring 6 and metal plate 10 on the other hand, without requiring exertion of an excessive degree of pressure.

Figure 6:
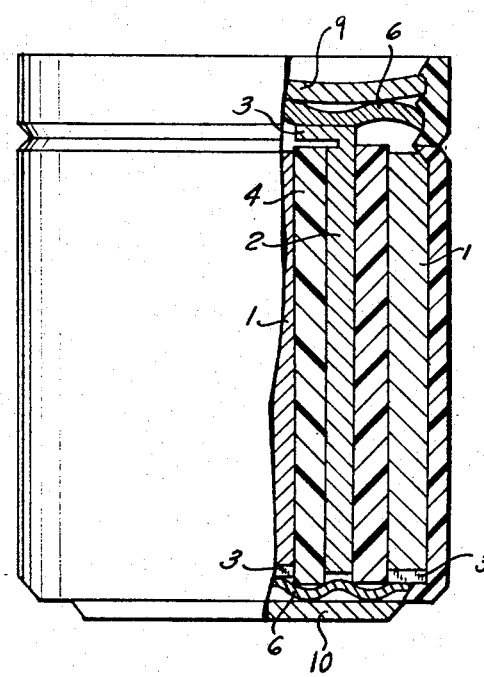
FIG. 6 is an elevational view partially in cross-section of a battery cell in accordance with the present invention and including the electrode arrangement of FIG. 5.

According to the embodiment illustrated in FIG. 6, lugs 3 are provided at opposite edges of negative electrode 1 and positive electrode 2 respectively. Spring 6 is again provided so as to contact lugs 3 of negative electrode 1, on the one hand, and metal plate 10 on the other hand.

A somewhat similar spring is also provided interposed between lugs 3 of positive electrode 2 and metal plate 9 of the battery or cell housing. According to a preferred embodiment, as illustrated in FIG. 6, metal plate 9 is of concave configuration reaching its lowest point at the axis of the housing.

The embodiment illustrated in FIG. 6 may also be modified by omitting one of opposite springs 6, for instance the spring adjacent to concave metal plate 9, and/or by replacing lugs 3 adjacent to metal plate 9 with rim portion 5 as illustrated in FIG. 4.

The rolled positive and negative electrodes may consist, for instance, in the case of an alkaline battery, of a carrier material such as nickel foil to which the positive active and negative mass, respectively adhere. Rim portions 5 and lugs 3 may then also consist of nickel foil. The main portion of the electrodes, except for rim portions 5 and lugs 3 may be covered with sintered metal powder, for instance nickel and the active mass will be held in the pores of the sintered metal layer. The active masses are conventional active masses and, in the case of an alkaline storage battery, for instance, may consist of active nickel mass and active cadmium mass.

It will be understood that each of the elements described above, or two or more together, may also find a useful application in other types of electric cells differing from the types described above.

While the invention has been illustrated and described as embodied in an alkaline storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An electric cell, comprising, in combination, a housing including an electrically conductive end wall electrically insulated with reference to the remainder of said housing, and an opposite end wall; a coiled electrode assembly located in said housing and consisting essentially of a pair of rolled electrodes of opposite polarity and a separator therebetween helically wound about each other so that said separator is interposed between adjacent windings of said electrodes, one of said electrodes having a side edge portion proximal to said end wall and provided with a plurality of conductive lugs of one piece with said one electrode and said lugs extending from said side edge portion substantially normal to the axis of said coiled assembly and in substantial parallelism with said end wall; and electrically conductive biasing means provided in said housing in electrically conductive biasing engagement with said lugs and said end wall.

2. An electric cell as defined in claim 1, wherein said electric cell is a galvanic cell.

3. An electric cell as defined in claim 1, both of said end walls being electrically conductive and being electrically insulated relative to each other, and wherein the other of said electrodes is also provided with a plurality of conductive lugs of one piece therewith extending from a side edge of said other electrode adjacent to said opposite one of said conductive end walls conductively contacting the latter.

4. An electric cell as defined in claim 1, wherein contacting portions of lugs extending from adjacent windings of said one electrode overlap each other.

5. An electric cell as defined in claim 1, wherein said biasing means further include spring means arranged between said opposite end wall and said assembly.

6. An electric cell as defined in claim 1, wherein said electric cell is a cell of a storage battery.

7. An electric cell as defined in claim 6, wherein said electric cell is a cell of an alkaline storage battery.

References Cited

UNITED STATES PATENTS

| | | | |
|---|---|---|---|
| 2,487,499 | 11/1949 | Webb | 136—13 |
| 2,934,580 | 4/1960 | Neumann | 136—6 |
| 2,954,417 | 9/1960 | Lehovec et al. | 136—13 |
| 3,250,645 | 5/1966 | Zahn et al. | 136—14 |
| 3,350,225 | 10/1967 | Seiger | 136—13 |

FOREIGN PATENTS 1,059,004  2/1967  Great Britain.

WINSTON A. DOUGLAS, *Primary Examiner.*

C. F. LE FEVOUR, *Assistant Examiner.*

U.S. Cl. X.R.

136—24, 28